No. 615,735. Patented Dec. 13, 1898.
S. N. McMILLAN.
TONGUE SUPPORT.
(Application filed Aug. 26, 1897.)

(No Model.)

Witnesses
Chas. P. Heinemann.
Victor J. Evans

Inventor
Silas N. McMillan
By John Wedderburn
Attorney

UNITED STATES PATENT OFFICE.

SILAS N. McMILLAN, OF LOOGOOTEE, ILLINOIS.

TONGUE-SUPPORT.

SPECIFICATION forming part of Letters Patent No. 615,735, dated December 13, 1898.

Application filed August 26, 1897. Serial No. 649,612. (No model.)

*To all whom it may concern:*

Be it known that I, SILAS N. MCMILLAN, of Loogootee, in the county of Fayette and State of Illinois, have invented certain new and useful Improvements in Tongue-Supports; and I do hereby declare the following to be a full, clear, and exact description of the invention, such as will enable others skilled in the art to which it appertains to make and use the same.

This invention relates to improvements in wagon-tongue supports, the object of the same being to provide a cheap, simple, and effective device of this character which will allow a slight vertical movement of the tongue and at the same time serve to hold the tongue firmly at the limit of its downward movement, the said support being made of metal which will give a spring tendency thereto.

With the above objects in view the invention consists in a flat bar of metal having openings or slots by which it is connected to the tongue and to the wagon or vehicle, all as will be hereinafter fully set forth, and particularly pointed out in the claim.

Figure 1:
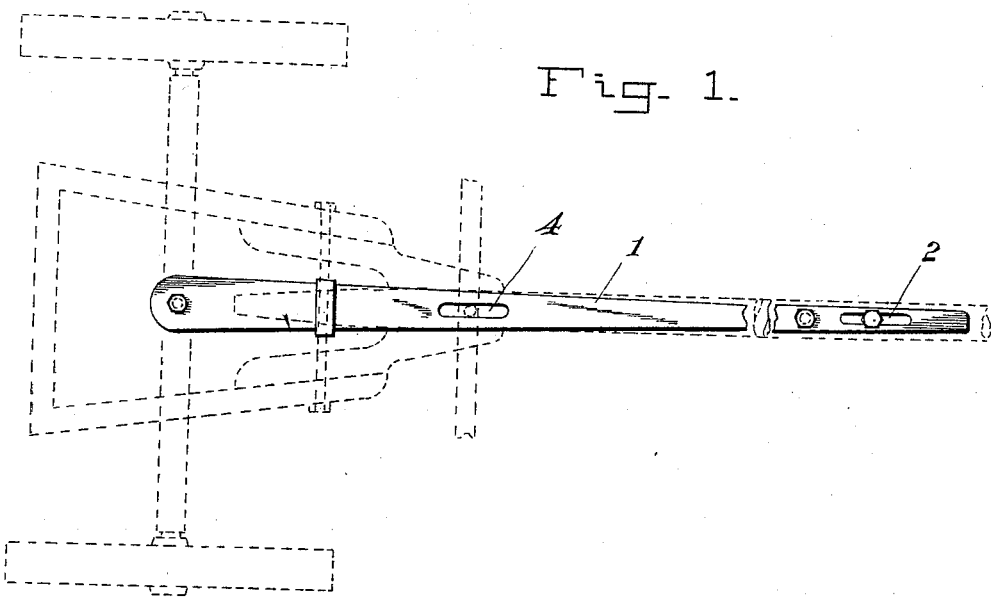
Figure 2:
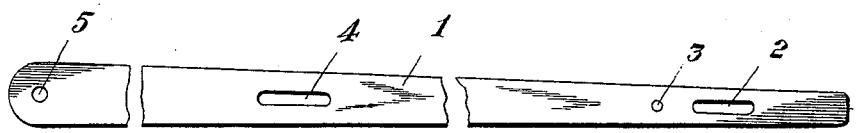

In the accompanying drawings, forming part of this specification, Figure 1 is a view illustrating the application of my invention. Fig. 2 is a detail plan view of the tongue-support detached.

My improved wagon-tongue support consists simply of a flat bar 1, preferably of spring metal, which is tapered from one end to the other, as shown. The smaller end of this bar is provided with a slot 2, adjoining which is an aperture or hole 3, and a suitable distance from the opposite or larger end of this bar is located a second slot 4, while the adjoining end has an aperture or hole 5, through which it is connected with the king-bolt. As before stated, this flat bar or metal plate is made of spring metal and is tapered, for the purpose hereinafter specified.

This tongue-support is applied to a wagon or vehicle by having the slot 4 placed in engagement with the lower end of the bolt connecting the whiffletree with the tongue and bringing the forward or reduced end under the tongue and attaching it thereto by a bolt or screw which passes through the slot 2, the larger end of the plate or support engaging a clip on the tongue, as shown in Fig. 1. In case it is not desired that the tongue have the movement which it would be permitted to have by reason of the slots 2 and 4 the connection to the tongue will be made through the aperture or hole 3.

It will be understood that the tongue of a vehicle supplied with this support will be properly held and at the same time have the movement limited in one direction by the support giving the spring movement thereto.

The support is very simple in construction and presents a device which can be applied to any ordinary vehicle and when in use will support the tongue, relieving the horses of the weight thereof, as well as preventing the outer end dropping too low.

Having thus described my invention, what I claim as new, and desire to secure by Letters Patent, is—

A tongue-support consisting of a flat spring-metal bar perforated at its rear end to adapt it to be connected with the king-bolt and provided in advance of said perforation with a slot for the reception of the hammer-bolt, said bar being tapered thence toward its forward end and having near said end an elongated bolt-slot 2 and a perforation 3 for the reception of a transferable bolt for securing said end to the tongue and preventing relative lateral play of said parts, the bolt, when engaged with the tongue through the slot 2, permitting vertical vibration of the tongue, and when engaged with the tongue through the perforation 3, forming a rigid connection between the spring-bar and the tongue for upholding the latter, substantially as described.

In testimony whereof I have signed this specification in the presence of two subscribing witnesses.

SILAS N. McMILLAN.

Witnesses:
H. HENDERSON STINE,
W. SEVERUS.